United States Patent Office 3,376,467
Patented Apr. 2, 1968

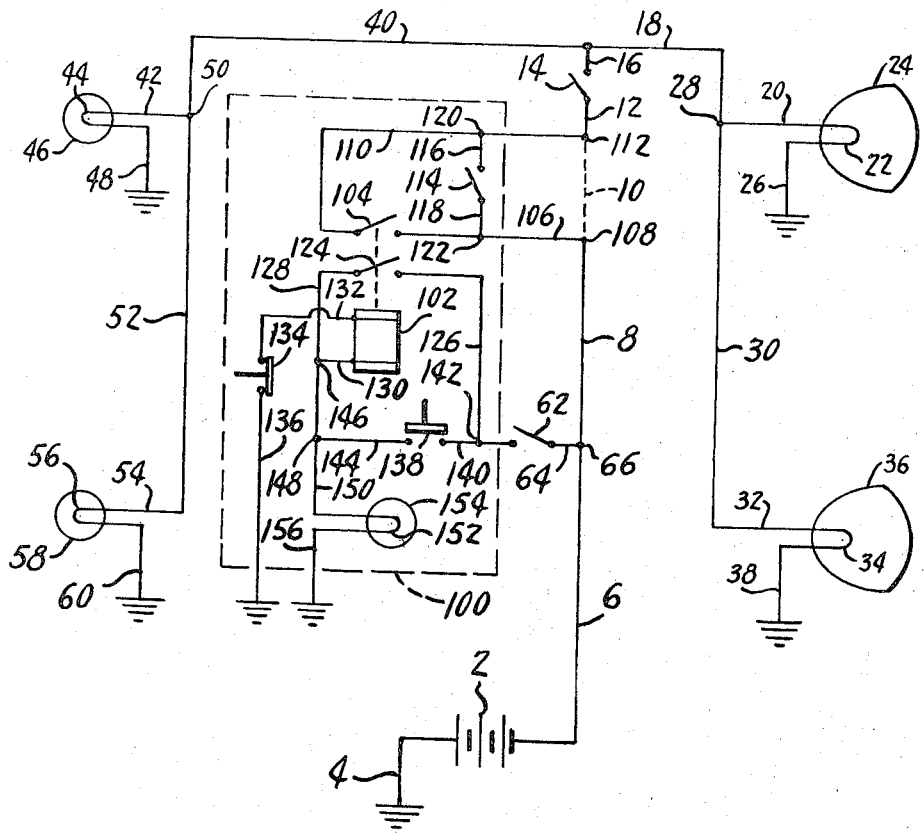

3,376,467
AUTOMOBILE HEADLAMP CIRCUIT WITH A SELF-HOLDING AND EXTINGUISHING CIRCUIT CONTROLLED BY THE IGNITION SWITCH
Harry A. Ree, 7906 Teton Way, North Highlands, Calif. 95660
Filed Oct. 3, 1966, Ser. No. 583,773
10 Claims. (Cl. 315—82)

This invention relates to an automobile headlight circuit and more specifically to a circuit for holding the automobile headlights in the on position after the lights have been turned on and for turning the lights off when the ignition is turned off to prevent the lights from being turned on again when the ignition switch is again closed.

It is known in the prior art to provide circuits for extinguishing automobile lights when the ignition switch is turned off. Often this is done merely by connecting the lights in series with the ignition switch; however, when this is done, the lights are turned on again when the ignition switch is closed. Thus, if one is driving at night and arrives home after dark, the lights are turned off when he opens the ignition switch. In the morning when it is light, he may return to his car and close the ignition switch to start the engine. This turns the lights on; however, since it is often daylight, the owner of the automobile may not be aware that the lights have been turned on again.

Circuits are also known which open the circuit to the lights when the ignition switch is opened and do not reclose the circuit to the lights when the ignition switch is again closed. Such circuits and devices have been expensive and difficult of manufacture and often may result in frequent trouble. Circuits which may accomplish this are disclosed in Patent No. 2,862,148.

It is an object of this invention to provide a simplified electronic holding circuit for maintaining the lights in energized condition when they have been turned on while the ignition switch is closed and for turning off the lights when the ignition switch is opened whereby reclosure of the ignition switch does not re-energize the lights.

It is a further object of this invention to provide a relay system for holding the lights on an automobile in an energized condition until the ignition switch is opened and to prevent the lights from being re-energized when the ignition switch is again closed.

A further object of this invention is the provision of a relay circuit having a single pole double throw pair of contacts for closing the circuit to an automobile lighting system when a switch is momentarily closed and for maintaining the lights in energized condition until a second switch is momentarily opened or until the ignition switch is opened.

An additional object of the invention is also the provision of an indicator light to indicate the state of energization of a relay circuit for energizing and maintaining automobile lights in energized condition until a switch is momentarily opened or the ignition switch is opened.

A further and important object of this invention is the provision of an integral unit including circuit means and components for energizing automobile headlights and maintaining them in the energized condition until the ignition switch is opened and preventing re-energization of the lights when the ignition switch is again closed.

With reference now to the drawing, an automobile conventionally includes a source of electric energy such as battery 2 which is generally connected by a conductor 4 to ground on one pole. A conductor 6 generally leads to the instrument system of the automobile where it is connected to the lighting system through conductors 8, 10 and 12. It will be noted that the conductor 10 is shown dotted since in this invention this segment of the conductor may be omitted. A switch 14 is generally included in the lighting system for turning the headlights on and off and likewise controlling the tail light. Switch 14 may be left closed at all times when the circuit of this invention is installed and may be omitted when the instant invention is installed in new cars and vehicles. Switch 14 is connected by conductors 16 and 18 through conductor 20 to the filament 22 of headlight 24 and conductor 26 to ground. Similarly, conductor 30 and conductor 32 lead to filament 34 of headlight 36 which is connected to ground by conductor 38. A conductor 40 leads through conductor 42 to the filament 44 of tail lamp 46 and thence to ground through conductor 48. An additional tail light may be connected at point 50 through conductor 52 and conductor 54 to the filament 56 of the additional tail light 58 and to ground through conductor 60.

Thus it will be seen that in the conventional automobile the closure of switch 14 will energize both the headlights and the tail lights. It will be realized that there are several variations of this electrical circuit. For example, nearly all automobiles include a dimmer circuit and a pair of filaments in the headlights which are not shown in the drawings for purposes of clarity. Similarly, parking lights and other lights may be connected in series through switch 14 but are omitted for purposes of clarity.

An ignition switch 62 is connected through conductor 64 at point 66 to the conductor 6 which leads to the electric energy source 2.

In a preferred embodiment, the improvement of this invention comprises a housing 100 which has mounted therein a relay 102 which has an actuating coil and which carrier normally open contacts 104. Contacts 104 are connected through conductor 106 to point 108 on conductor 8 and through conductor 110 to point 112 to conductor 12. The conductor 10 is omitted in connecting the improvement of this invention into the conventional automobile lighting circuit. A disabling switch 114 which is connected by conductors 116 and 118 to points 120 and 122 may be connected in electrical parallel with switch 104 to overriding the circuit of this invention if it is desired. When switch 114 is closed, the automobile lighting circuit will be turned on and off by switch 14 in the normal manner.

Contacts 124 are also mounted on and operated by relay 102 and are connected through conductor 126 to the ignition switch 62. Contacts 124 are also connected to conductor 128 and through conductor 130 to relay 102. The other side of the actuating coil of relay 102 is connected by conductor 132 through a normally closed momentarily opening switch 134 and conductor 136 to ground which is the return route to the opposite pole of the electric energy source. Normally opened momentarily closing switch 138 is connected by conductor 140 to conductor 126 at point 142 and by conductor 144 at point 146 to conductor 130, in electrical parallel with contacts 124.

At point 148 a conductor may lead to the filament 152 of a pilot light 154 which is connected by conductor 156 to ground.

In operation, with the holding circuit of this improvement in operation, that is with switch 114 open, the ignition switch 62 must be closed in order to turn the lights on. The lights are turned on by closing switch 138 momentarily which completes a circuit from the electric energy source 2 through ignition switch 62 to the relay 102 and through the switch 134 to ground. When relay 102 is energized it closes contacts 104 and 124. The closing of contacts 104 energizes the lights of the automobile.

The closure of contacts 124 closes a holding circuit to maintain the relay 102 in energized position, thereby maintaining the lights in energized condition. The lights will remain energized until ignition switch 62 is opened. When ignition switch 62 is opened the relay is de-energized. It will be noted, however, that if ignition switch 62 is reclosed, relay 102 will not return to the energized condition because the holding path through contacts 124 has been opened. The lights may also be turned off by momentarily opening switch 134 to de-energize relay 102. Similarly, the closure of momentarily opening switch 134 does not re-energize relay 102 since the holding circuit through contacts 124 have been opened. Since the pilot light 154 is electrically interconnected with the relay 102, it will indicate the state of energization of relay 102 at any given time.

Thus it will be seen that a hold circuit has been provided in an automobile lighting circiut which permits the lights to be turned on and maintained in the energized condition when the ignition switch is closed and for de-energizing the lights when the ignition switch is opened and which prevents re-energization of the lights upon reclosure of the ignition switch. Thus all the objects of the invention are accomplished by the invention as disclosed.

It will be realized that the invention has been disclosed with reference to a specific embodiment and that variations of the above inventive concept may be made in the light of the teachings of the specification and the drawings without departing from the inventive concept. The scope of the invention is defined in the appended claims.

I claim:
1. In an automobile lighting circuit which comprises a pair of headlights, tail lights, a source of electrical energy, a switch for energizing the lights, circuit means interconnecting the lights, switch and electric energy source and further including an ignition switch and circuit means interconnecting the ignition switch and the electric energy source;

the improvement wherein the lighting circuit further includes a holding circuit for automatically turning the lights off when the ignition switch is opened and preventing energization of the lights when the ignition switch is again closed which comprises:
   an electric relay having a coil,
   a first pair of normally open contacts on the relay;
   circuit means icnluding the first contacts for opening and closing the lighting circuit between the electric energy source and the lights;
   a second pair of normally open contacts on the relay;
   circuit means from the electric energy source through the ignition switch, the second contacts, the relay coil to the opposite pole of the source of electric energy;
   a momentarily closing normally open switch; and circuit means connecting the momentarily closing switch in electrical parallel with the second pair of contacts to energize the relay coil to turn the lights on through the first contacts and close the second contacts to apply holding voltage to the relay coil to maintain the lights in the on position until the ignition switch is opened;
   whereby when the ignition switch is again closed the relay coil is not energized and the lights are not turned on again.

2. The improvement of claim 1 wherein the first contacts are electrically interposed between the electric energy source and the lighting circuit switch for energizing the lights.

3. The improvement of claim 1 further including a normally closed momentary opening switch in the circuit means from the electric energy source through the ignition switch, the second contacts, and the relay coil for de-energizing the relay coil while maintaining the ignition switch in closed position.

4. The improvement of claim 1 further including a pilot light and circuit means interconnecting the pilot light and the relay coil for indicating the state of energization of the relay coil.

5. The improvement of claim 1 further including an overriding switch and circuit means connecting the overriding switch in electrical parallel with the first contacts to overriding the holding circuit.

6. The improvement of claim 1 further including a housing and wherein the components of the holding circuit are mounted in the housing.

7. The improvement of claim 2 further including a normally closed momentary opening switch in the circuit means from the electric energy source through the ignition switch, the second contacts, and the relay coil for de-energizing the relay coil while maintaining the ignition switch in closed position.

8. The improvement of claim 7 further including a pilot light and circuit means interconnecting the pilot light and the relay coil for indicating the state of energization of the relay coil.

9. The improvement of claim 8 further including an overriding switch and circuit means connecting the overriding switch in electrical parallel with the first contacts to overriding the holding circuit.

10. The improvement of claim 9 further including a housing and wherein the components of the holding circuit are mounted in the housing.

References Cited
UNITED STATES PATENTS

| | | | |
|---|---|---|---|
| 2,806,980 | 9/1957 | Shapiro | 315—83 |
| 2,862,148 | 11/1958 | Waigel | 315—80 |
| 2,910,621 | 10/1959 | Paule | 315—82 |
| 3,139,555 | 6/1964 | Paule et al. | 315—82 |

JAMES W. LAWRENCE, *Primary Examiner.*

C. R. CAMPBELL, *Assistant Examiner.*